United States Patent [19]

Escher et al.

[11] Patent Number: 5,231,528
[45] Date of Patent: Jul. 27, 1993

[54] FERROELECTRIC LIQUID CRYSTAL COMPONENTS HAVING HIGH SPONTANEOUS POLARIZATION AND LOW HELICAL PITCH

[75] Inventors: Claus Escher, Mühltal; Wolfgang Hemmerling, Sulzbach; Gerhard Illian, Frankfurt am Main; Takamasa Harada, Oberursel, all of Fed. Rep. of Germany; Mikio Murakami, Kakegawa, Japan

[73] Assignee: Hoechst Aktiengesellschaft, Frankfurt am Main, Fed. Rep. of Germany

[21] Appl. No.: 981,933

[22] Filed: Nov. 20, 1992

Related U.S. Application Data

[63] Continuation of Ser. No. 541,603, Jun. 21, 1990, abandoned.

[30] Foreign Application Priority Data

Jun. 23, 1989 [DE] Fed. Rep. of Germany ....... 3920625

[51] Int. Cl.$^5$ .............................................. G02F 1/13
[52] U.S. Cl. .................................... 359/104; 359/99; 359/100
[58] Field of Search ............ 350/347 E, 347 R, 347 V, 350/337, 350 S, 352, 334, 346, 351; 359/90, 93, 99, 100, 104

[56] References Cited

U.S. PATENT DOCUMENTS

| | | | |
|---|---|---|---|
| 4,367,924 | 1/1983 | Clark et al. | 350/334 |
| 4,778,259 | 10/1988 | Kitayama et al. | 350/341 |
| 4,824,217 | 4/1989 | Chan et al. | 350/350 S |
| 4,832,461 | 5/1989 | Yamagishi et al. | 350/346 |
| 4,834,500 | 5/1989 | Hilsum et al. | 350/341 |
| 4,852,978 | 8/1989 | Davey et al. | 350/350 S |
| 4,876,028 | 10/1989 | Hemmerling et al. | 350/346 |
| 4,913,838 | 4/1990 | Miyazawa et al. | 350/350 S |
| 4,931,208 | 6/1990 | Furukawa et al. | 350/350 S |
| 4,943,387 | 7/1990 | Furukawa et al. | 350/350 S |
| 4,969,719 | 11/1990 | Bradshaw et al. | 350/337 |

FOREIGN PATENT DOCUMENTS

| | | | |
|---|---|---|---|
| 032362 | 8/1984 | European Pat. Off. | 350/334 |
| 0283916A3 | 9/1988 | European Pat. Off. | 359/104 |
| 0309774A2 | 4/1989 | European Pat. Off. | 359/104 |
| 2174820 | 11/1986 | United Kingdom | 350/350 S |

OTHER PUBLICATIONS

Clark et al., Mol. Cryst. Liq. Cryst., vol. 94, pp. 213-234 (1983).
Gray et al., Thermotropic Liquid Crystals, (1987).
L. A. Beresnev, et al., Electrooptic response of a thin layer of a ferroelectric liquid crystal with a small helcoid pitch and a high spontaneous polarization, Feb., 1988, pp. 116–117.
J. Fünfschilling and M. Schadt, Fast responding and highly multiplexible distorted helix ferroelectric liquid-crystal displays, Oct. 15, 1989, pp. 3877-3882.

*Primary Examiner*—Rolf Hille
*Assistant Examiner*—Minhloan Tran
*Attorney, Agent, or Firm*—Curtis, Morris & Safford

[57] ABSTRACT

What is described is a surface stabilized ferroelectric liquid crystal display with a layer thickness of 1 to 10 μm containing a ferroelectric liquid crystal mixture having a high spontaneous polarization of $P_s$ greater than 20 nC·cm$^{-2}$ and a natural helical pitch of less than one half of the layer thickness.

12 Claims, No Drawings

FERROELECTRIC LIQUID CRYSTAL COMPONENTS HAVING HIGH SPONTANEOUS POLARIZATION AND LOW HELICAL PITCH

This application is a continuation of application Ser. No. 07/541,603, filed Jun. 21, 1990, now abandoned.

BACKGROUND OF THE INVENTION

Switching and display components containing ferroelectric liquid crystal mixtures ("FLC displays") are known, for example, from EP-B 0,032,362 (=U.S. Pat. No. 4,367,924). They are constructed in such a manner that the FLC layer is enclosed on both sides by specific layers, which are usually—in this sequence, starting from the FLC layer—at least one electrically insulating layer, electrodes and a boundary plate (e.g. of glass). Moreover, they include a polarizer, if they are operated in the "guest-host" mode or in the reflexive mode, or two polarizers if transmission by refringence is employed as the mode. One or preferably both electrically insulating layers are employed as the so-called orientation layer.

Such orientation layers bring—in conjunction with a spacing of the boundary plates which is selected to be sufficiently small—the FLC in the FLC mixture into a configuration in which the molecules are arranged with their longitudinal axes parallel to one another and the smectic planes are disposed perpendicular or obliquely to the orientation layer. In this arrangement, as is known, the molecules have two equivalent orientations, between which they can be switched by pulsed application of an electric field, i.e. FLC displays can be switched in a bistable manner and the switching times are in the μs range, these being inversely proportional to the spontaneous polarization of the FLC mixture.

The essential advantage of such FLC displays as compared with the LC displays which can still to date essentially be encountered in industrial practice is considered to be the attainable multiplex ratio, i.e. the maximum number of targets which can be driven in the time-sequential process ("multiplex" process), which is significantly larger in the case of FLC displays. This electrical drive is essentially based on the above-described pulsed addressing.

In the course of the further development of FLC displays during the last 10 years, a disadvantage has however emerged, which resides in that the aforementioned pulsed addressing leads to a reproducible switching between the two stable states frequently only in the case of sufficiently small values for the spontaneous polarization. By way of example, it may be observed that in an FLC display which has been situated for a relatively great length of time in one of the two stable states ("standing image") switching over to the respective other state can take place only with very great difficulty, i.e. only with high amplitude or a very long pulse duration of the applied voltage. In the case of pictorial displays, this behavior of an optical hysteresis leads to a situation in which an image which has been inscribed over a relatively great length of time can be recognized in the following image, as a silhouette in the form of a "ghost image". It appears that this observation of an optical hysteresis is the more marked, the greater is the spontaneous polarization of the FLC mixture. In the case of particularly high values ($P_s > 35$ nC·cm$^{-2}$), it is as a rule no longer possible to achieve any switching by means of pulsed addressing. One of the concepts as to the cause of this phenomenon of an optical hysteresis is to the effect that ionic impurities in the FLC mixture could be responsible for this. The formerly known attempts at a solution; a) direct contact between FLC mixture and electrodes and b) intensive cleaning have not yet given satisfactory results; the first method is very costly in the avoidance of electrical short circuits, and the second requires a specific type of purification almost for each individual component of a mixture In the case of the hitherto known FLC displays, the starting point is, on a controlled basis, that the spacing of the boundary plates is chosen in such a manner that the development of the twist ("helix") typical of ferroelectric phases is suppressed. This takes place in such a manner that—see the initially cited EP-B 0,032,362—the spacing of the plates is smaller than approximately five times the natural helical pitch. However, on account of the optical switching behavior and for general technological reasons, there is virtually no possibility of setting the spacing of the plates to arbitrarily small, so that in practice a spacing of approximately 2 μm is adopted. For this reason, efforts were hitherto made to develop FLC mixtures having the greatest possible helical pitch; this has also recently been made subject to further demands (Gray et al., Thermotropic Liquid Crystals, 1987) according to which the spacing of the plates should be less than one quarter of the helical pitch.

SUMMARY OF THE INVENTION

The object of the present invention is to develop FLC mixtures which do not exhibit any optical hysteresis, in spite of high values in spontaneous polarization.

The invention proceeds from the known FLC displays—by display and switching components using LC mixtures, which exhibit a ferroelectric phase—which operate using SSFLC technology ("surface stabilized ferroelectric liquid crystal"), as is described, for example, in the aforementioned EP-B 0,032,362. These FLC displays have a layer thickness (i.e. spacing of the boundary plates) of 1 to 10 μm, and especially of 1.2 to 3 μm. According to the invention, in such FLC displays use is made of those FLC mixtures which exhibit a high spontaneous polarization of $P_s > 20$ nC·cm$^{-2}$ (measured at 25° C.), preferably of $P_s > 35$ nC·cm$^{-2}$, in particular of 40 nC·cm$^{-2}$, and exhibit a natural helical pitch of less than one half of the layer thickness of the aforementioned SSFLC displays, in particular of more than 1/10 of this layer thickness. Preferably, such displays are subjected to pulsed addressing.

DESCRIPTION OF THE PREFERRED EMBODIMENTS

In preferred embodiments, the ferroelectric phase is an $S_c^*$ phase and the phase sequence of the FLC mixture proceeds as follows:

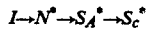

$$I \rightarrow N^* \rightarrow S_A^* \rightarrow S_c^*$$

in this case in the entire temperature range of the N* phase the helical pitch is no less than 8 μm, preferably no less than 15 μm. The stated properties (i.e. high spontaneous polarization, a first specified helical pitch in the smectic phase and a second specified helical pitch in the cholesteric phase) are in particular satisfied by non-chiral LC basic mixtures, to which two or more appropriate chiral dopants are added. Expediently, such chiral dopants contribute to the extent of at least 20% to the spontaneous polarization of the total mixture, possess the same sign in the values of the spontaneous polarization; at the same time, they contribute to the extent of at least 20% to the natural helical pitch in the smectic phase and have an identical sense of rotation in their twist capacity; in the N* phase, two of the chiral dopants do moreover exhibit differing signs (non-identical sense of rotation) in their twist capacity.

The chemical compounds which satisfy the aforementioned conditions in non-chiral LC basic mixtures include, in particular, those of the general formulae (I) and (II)

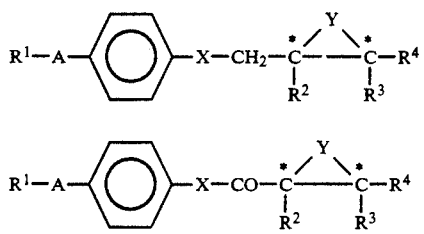

where the symbols and indices have the following meaning:

$R^1$ = straight-chain or branched-chain $C_1$–$C_{12}$)alkyl, in which one or two non-adjacent —$CH_2$— groups may be replaced by —O— and/or —S—, A = diazin-2,5-diyl or azin-2,5-diyl X, Y = O and/or S, and $R^2$, $R^3$, $R^4$ = independently of one another H, straight-chain ($C_1$–$C_{10}$)alkyl or branched-chain ($C_3$–$C_{10}$)alkyl, in which $R^2$, $R^3$ and $R^4$ are not simultaneously H.

In particularly preferred embodiments, the following are applicable:

$R^1$ = straight-chain ($C_5$–$C_{11}$)alkyl, in which a —$CH_2$— group can be replaced by —O— or —S—;

X, Y = O;

$R^2$, $R^3$ = H and $R^4$ = straight-chain or branched-chain ($C_3$–$C_7$)alkyl;

A = pyrimidin-2,5-diyl.

Surprisingly, using the aforementioned FLC mixture it was even possible to suppress the in the present case undesired—development of a helix in the ferroelectric phase, if the layer thickness is greater than 10 times the natural helical pitch. Even in FLC mixtures having natural helical pitches of <0.7 μm in the ferroelectric phase, no optical hysteresis occurs at high $P_s$ values; at $P_s$ values of >100 nC·cm$^{-2}$, no "ghost images" were observed any longer. Further advantages of the invention reside in the retention of the short switching times and in the possibility of portraying grey gradations.

EXAMPLES

In the examples set out below, two achiral LC basic mixtures A and B and various chiral dopants are used. In comparison therewith, the values of an LC basic mixture A with a combination of two chiral dopants which is not in accordance with the invention are investigated.

LC mixture A contains (in % by weight)

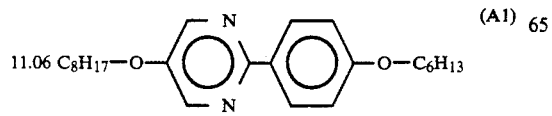

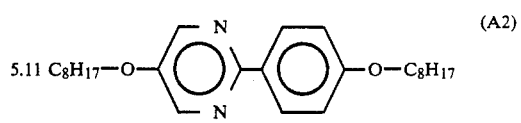

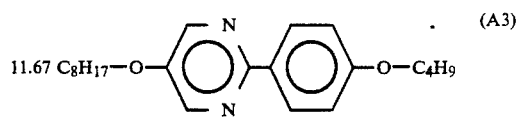

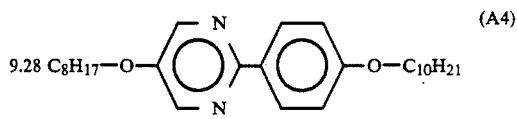

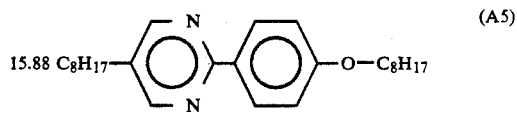

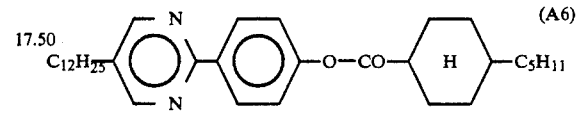

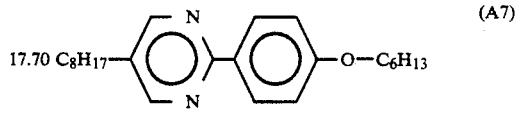

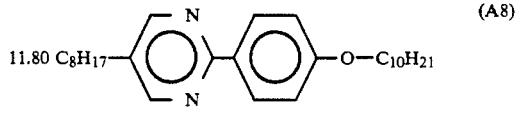

The mixture shows the following phase sequence:

$X$—1$S_C$69$S_Z$76$N$93$I$

LC mixture B contains (in % by weight)

13.39  A1 (=B1)
4.49   A2 (=B2)
14.78  A3 (=B3)
8.14   A4 (=B4)

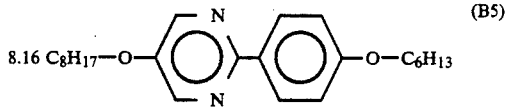

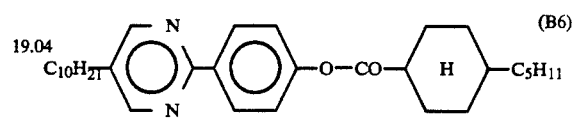

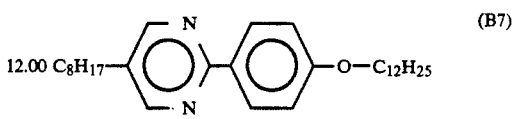

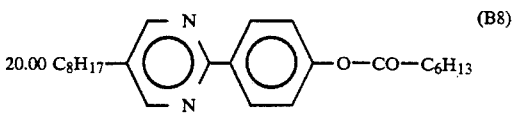

The mixture shows the following phase sequence:

$X - 6 S_C 71 S_Z 78 N 94 I$

Examples of dopants which are suitable according to the invention are:

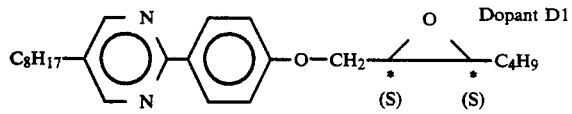
Dopant D1

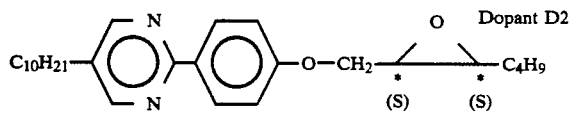
Dopant D2

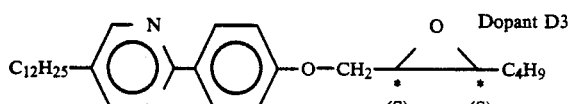
Dopant D3

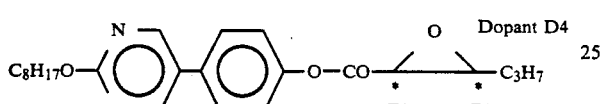
Dopant D4

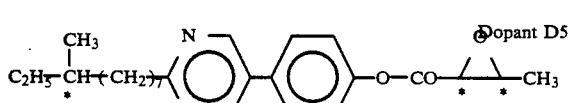
Dopant D5

Dopant D6

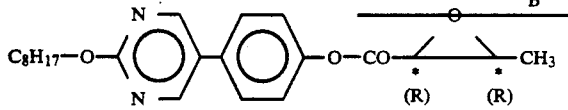

In detail, the listed dopants in the LC mixtures A and/or B show the following data at an admixture rate of 10% (see Table I).

The following examples (FLC mixtures) according to the invention were produced from the aforementioned dopants and the likewise listed LC mixtures, having regard to the above data:

EXAMPLE 1

The FLC mixture M1 possesses the following composition (in mol %)

| LC mixture A | 65.6 |
|---|---|
| Dopant D1 | 11.4 |
| Dopant D2 | 5.7 |
| Dopant D3 | 11.4 |
| Dopant D5 | 5.9 | and the phase sequence $S_c^* 63 S_Z^* 74\ 78 I$

EXAMPLE 2

The FLC mixture M2 possesses the following composition

| LC mixture A | 70.6 |
|---|---|
| Dopant D1 | 23.0 |
| Dopant D4 | 7.0 | and the phase sequence $S_c^* 64 S_Z^* 65.5 N^* 80 I$

EXAMPLE 3

The FLC mixture M3 possesses the following composition

| LC mixture B | 72.0 |
|---|---|
| Dopant D1 | 8.8 |
| Dopant D2 | 4.4 |
| Dopant D3 | 8.8 |
| Dopant D8 | 6.0 | and the phase sequence $S_c^* 68.5 S_A^* 76 N^* 83.5 I$

TABLE I

| Added dopant | LC mixture | Measurement temperature (°C.) | Twist capacity HTP in $S_c^*$ ($\mu m^{-1}$) | HTP in N* ($\mu m^{-1}$) | $P_s$ (nC · cm$^{-2}$) |
|---|---|---|---|---|---|
| D1 | A | 10 | +9.7 | <0 | +18 |
|  | A | 20 | +7.1 |  | +13 |
|  | B | 10 | — | — | +21 |
|  | B | 20 | — |  | +16 |
| D2 | A | 10 | +9.7 | <0 | +18 |
|  | A | 20 | +6.7 |  | +14 |
|  | B | 10 | — | <0 | +22 |
|  | B | 20 | — |  | +17 |
| D3 | A | 10 | +8.6 | <0 | +19 |
|  | A | 20 | +5.2 |  | +15 |
|  | B | 10 | — | <0 | +23 |
|  | B | 20 | — |  | +18 |
| D4 | A | 10 | +5.7 | >0 | +54 |
|  | A | 20 | +4.3 |  | +50 |
| D5 | A | 10 | +21.7 | >0 | +44 |
|  | A | 20 | +12.0 |  | +34 |
| D6 | B | 10 | >0 | >0 | +52 |
|  | B | 20 |  |  | +45 |

REFERENCE EXAMPLE V1

The FLC mixture VM1 possesses the following composition

| LC mixture A | 77.7 |
|---|---|
| Dopant D7 | 10.3 |
| Dopant D8 | 5.0 |
| Dopant D4 | 7.0 |

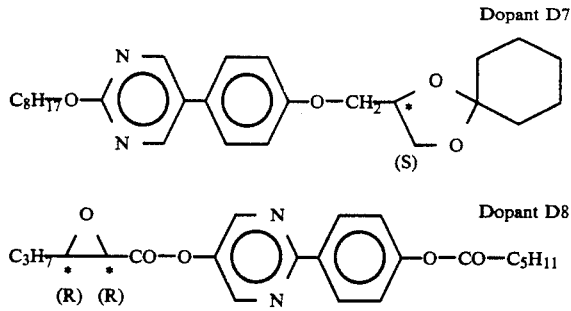

and the phase sequence $S_c^*58S_A^*67N^*78I$.

At a temperature of 15° C., this FLC mixture VM1 exhibits a value of $P_s$ of +55 nC·cm$^{-2}$. In the $S_c^*$ phase the dopants D7 and D8 possess a different sign in their twist capacity and give in total a pitch which is large as compared with the cell thickness (layer thickness).

At a temperature of 15° C., this FLC mixture VM1 exhibits a value of $P_s$ of +55 nC·cm$^{-2}$. In the $S_c^*$ phase the dopants D7 and D8 possess a different sign in their twist capacity and give in total a pitch which is large as compared with the cell thickness (layer thickness).

The measurement results of Examples 1 to 3 according to the invention are presented in Table II. For all measured temperatures, the pitch of M1 to M3 in the cholesteric phase is greater than 8 μm. In the case of a pulsed addressing at 15° C., bipolar pulses of a total width of 400 μs and a height of 3 V/μm are generated (with M1), and the gaps between the pulses amount to 20 ms. A comparison with VM1 does not lead to the pulse heights of the mixtures according to the invention, but to the optical hysteresis described in the introduction. The optical contrast (in exposed units) was determined as the difference in transmission between the two bistable states in a test cell (of thickness as indicated) (see Table II).

TABLE II

| FLC mixture | Measurement temperature (°C.) | Pitch Z in $S_c^*$ (μm) | $P_s$ (nC·cm$^{-2}$) | Contrast CR |
|---|---|---|---|---|
| M1 (Test cell 2.6 μm) | 10 | +0.25 | +66 | 0.40 |
|  | 15 | +0.32 | +66 | 0.35 |
|  | 20 | +0.39 | +55 | 0.33 |
|  | 25 | +0.46 | +50 | 0.31 |
| M2 (Test cell 2.04 μm) | 10 | +0.38 | +79 | 0.64 |
|  | 15 | +0.45 | +72 | 0.35 |
|  | 20 | +0.52 | +65 | 0.17 |
|  | 25 | +0.59 | +58 | 0.08 |
| M3 (Test cell 2.06 μm) | 10 | +0.38 | +77 | 2.36 |
|  | 15 | +0.46 | +70 | 1.98 |
|  | 20 | +0.55 | +62 | 1.60 |
|  | 25 | +0.63 | +55 | 1.10 |

We claim:

1. A surface stabilized ferroelectric liquid crystal display with a layer thickness of 1 to 10 μm, which comprises a ferroelectric liquid crystal mixture containing at least 65.6% by weight of achiral components and having a high spontaneous polarization of $P_s > 20$ nC·cm$^{-2}$ and a natural helical pitch of less than one half of the layer thickness.

2. The display as claimed in claim 1, wherein the layer thickness is 1.2 to 3 μm.

3. The display as claimed in claim 2, wherein the helical pitch is greater than 1/10 of the layer thickness.

4. The display as claimed in claim 2, wherein the ferroelectric liquid crystal mixture exhibits a spontaneous polarization of $P_s \leq 35$ nC·cm$^{-2}$.

5. The display as claimed in claim 2, wherein the ferroelectric liquid crystal mixture exhibits a spontaneous polarization of $P_s > 40$ nC·cm$^{-2}$.

6. The display as claimed in claim 1, wherein the helical pitch is greater than 1/10 of the layer thickness.

7. The display as claimed in claim 6, wherein the ferroelectric liquid crystal mixture exhibits a spontaneous polarization of $P_s > 35$ nC·cm$^{-2}$.

8. The display as claimed in claim 6, wherein the ferroelectric liquid crystal mixture exhibits a spontaneous polarization of $P_s > 40$ nC·cm$^{-2}$.

9. The display as claimed in claim 1, wherein the ferroelectric liquid crystal mixture exhibits a spontaneous polarization of $P_s > 35$ nC·cm$^{-2}$.

10. The display as claimed in claim 1, wherein the ferroelectric liquid crystal mixture exhibits a spontaneous polarization of $P_s > 40$ nC·cm$^{-2}$.

11. A ferroelectric liquid crystal display for surface stabilized ferroelectric liquid crystal technology, said display having a layer thickness of 1 to 10 μm, containing a ferroelectric liquid crystal mixture containing at least 65.6% by weight of achiral components and having a high spontaneous polarization of $P_s > 20$ nC·cm$^{-2}$ and a natural helical pitch of less than one half of the layer thickness of the ferroelectric liquid crystal display.

12. The ferroelectric liquid crystal display as claimed in claim 11, wherein molecular orientation of the ferroelectric liquid crystal mixture is switched by pulsed application of an electric field.

* * * * *